United States Patent
Khermosh

(10) Patent No.: US 7,555,214 B2
(45) Date of Patent: Jun. 30, 2009

(54) METHOD OF ETHERNET FRAME FORWARD ERROR CORRECTION INITIALIZATION AND AUTO-NEGOTIATION

(75) Inventor: Lior Khermosh, Givatayim (IL)

(73) Assignee: PMC-Sierra Israel Ltd., Herzeliya-Pituach (IL)

(*) Notice: Subject to any disclaimer, the term of this patent is extended or adjusted under 35 U.S.C. 154(b) by 594 days.

(21) Appl. No.: 10/529,205

(22) PCT Filed: Dec. 16, 2003

(86) PCT No.: PCT/IL03/01082

§ 371 (c)(1),
(2), (4) Date: Mar. 25, 2005

(87) PCT Pub. No.: WO2004/056025

PCT Pub. Date: Jul. 1, 2004

(65) Prior Publication Data

US 2008/0260378 A1    Oct. 23, 2008

Related U.S. Application Data

(60) Provisional application No. 60/433,617, filed on Dec. 16, 2002.

(51) Int. Cl.
*H04B 10/08* (2006.01)

(52) U.S. Cl. .............................. 398/27; 398/25; 398/77
(58) Field of Classification Search ............ 398/25–27, 398/58, 63, 77, 128, 190
See application file for complete search history.

(56) References Cited

U.S. PATENT DOCUMENTS

| | | | |
|---|---|---|---|
| 7,062,165 B2 * | 6/2006 | Brissette et al. | 398/27 |
| 2002/0165978 A1 * | 11/2002 | Chui | 709/238 |
| 2003/0137975 A1 * | 7/2003 | Song et al. | 370/353 |
| 2004/0208501 A1 * | 10/2004 | Saunders et al. | 398/9 |

* cited by examiner

*Primary Examiner*—Dzung D Tran
(74) *Attorney, Agent, or Firm*—Mark M. Friedman

(57) ABSTRACT

A method of managing forward error correction (FEC) initialization and auto-negotiation in ethernet passive optical networks includes receiving FEC data from an optical network unit (ONU 105), and the optical line terminal (OLT 103) responds to the ONU with FEC data. Upon receiving data not forward error corrected from an ONU. The OLT responds with data not coded for FEC (203). Similarly, upon receiving forward error corrected data from the OLT, the ONU responds with forward error corrected data (503); and upon receiving data not forward error corrected from the OLT, the ONU responds with data not forward error corrected (203). The communications quality from the ONU is monitored (501), if the communications quality is not sufficient, the OLT transmits forward error corrected data to the ONU; otherwise, the OLT transmits non-FEC data to the ONU.

2 Claims, 5 Drawing Sheets

METHOD OF ETHERNET FRAME FORWARD ERROR CORRECTION INITIALIZATION AND AUTO-NEGOTIATION

Priority: U.S. provisional application 60/433,617; Filed: 16 Dec. 2002

FIELD AND BACKGROUND OF THE INVENTION

The present invention relates to passive optical networks and, more particularly, to a method of performing forward error correction initialization and auto-negotiation in passive optical networks.

Optical fiber links can best meet service providers' needs for high bandwidth combined with long reach for economical deployment. Fiber has taken over the long-haul network backbone and is emerging in the metropolitan area. Access networks, however, with their large number of endpoints, require a different network topology than SONET or DWDM used in long-haul and metro networks. A passive optical network (PON), including an optical line terminal (OLT) in the central office, optical network units (ONUs) at customer premises, shared fiber runs, and passive optical splitters, offers powerful advantages for broadband access networks.

For several decades Ethernet (IEEE 802.3) has been widely used in local area networks. More recently, Ethernet has been used with increasing frequency in metro and other wide area optical network applications, including passive optical networks.

Ethernet passive optical networks (EPONs), based on Gigabit Ethernet and the emerging IEEE 802.3ah protocol standard, offer the high capacity and low cost needed for broadband access wide area networks to be deployed widely and economically.

In the wide area network applications, signal attenuation and distortion become significant because of the distances involved and because the optical power splitters inherently attenuate signals. Forward error correction (FEC) is one method for reducing the bit error rate for a signal with an intrinsically low signal to noise ratio. FEC is a coding technique that uses additional, i.e. redundant symbols, as part of a transmission of a digital sequence through a physical channel. Because of the presence of redundancy, when errors corrupt the received signal, the receiver subsequently recognizes and corrects the errors without requesting data frame retransmission. Forward error correction in EPONs is described in co-pending PCT patent application IB02/01370 entitled, "Forward Error Correction Coding in Ethernet Networks", assigned to Passave Networks Ltd., Tel Aviv Israel, and is incorporated herein by reference for all purposes as if fully set forth herein. PCT patent application IB02/01370 is referred to hereinafter as '370. As disclosed in '370, FEC coded data is received by a non-FEC OLT and/or ONU.

Presently, most of the OLTs and ONUs to be installed in new EPONs and upgrades of existing EPONs will support FEC. However, equipment already installed does not support FEC. Since FEC improves network performance when communications are limited by bit errors, it is desirable to employ FEC when available and required, despite the bit rate penalty, but it is not desirable to employ FEC when not required because of the bit rate penalty. Therefore, an automatic method is desirable in an EPON to acquire information from each ONU, when the ONU is installed, to determine if FEC is supported and required and implement FEC to decrease the bit error rate. If FEC is not available or not required, the communication between the OLT and an ONU uses ethernet frames without FEC coding.

There is thus a widely recognized need for, and it would be highly advantageous to have a method of performing forward error correction initialization and auto-negotiation in passive optical networks

SUMMARY OF THE INVENTION

According to the present invention there is provided a method of initiating forward error correction in an ethernet passive optical network including an optical network unit, including the steps of: (a) upon receiving forward error corrected data from the optical network unit, responding with forward error corrected data; and (b) upon receiving data not forward error corrected from the optical network unit, responding with data not forward error corrected.

According to the present invention there is provided a method of initiating forward error correction in an ethernet passive optical network including an optical line terminal, including the steps of: (a) upon receiving forward error corrected data from the optical line terminal, responding with forward error corrected data; and (b) upon receiving data not forward error corrected from the optical line terminal; responding with data not forward error corrected.

According to the present invention there is provided a method of managing forward error correction in an ethernet passive optical network including an optical network unit, including the steps of: (a) monitoring communications quality from the optical network unit, thereby determining a figure of merit of the communications; (b) upon finding the figure of merit to be insufficient, transmitting forward error corrected data to the optical network unit; and (c) upon finding the figure of merit to be sufficient, transmitting data not forward error corrected data to the optical network unit. Preferably, the figure of merit is one of (i) bit error rate, (ii) parity violation rate, (iii) 8B/10B coding violation rate and (iv) frame error rate.

According to the present invention there is provided a method of managing forward error correction in an ethernet passive optical network including an optical line terminal, including the steps of: (a) monitoring communications quality from the optical line terminal, thereby determining a figure of merit of the communications; (b) upon finding the figure of merit to be insufficient, transmitting forward error corrected data to the optical line terminal; and (c) upon finding the figure of merit to be sufficient, transmitting data not forward error corrected to the optical line terminal. Preferably, the figure of merit is one of (i) bit error rate, (ii) parity violation rate, (iii) 8B/10B coding violation rate and (iv) frame error rate.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of performing forward error correction initialization and auto-negotiation in passive optical networks.

When a new ONU 105 is installed in an EPON 10, functional according to an embodiment of the present invention, a forward error correction initialization and auto-negotiation process, as disclosed above, is initiated.

Specifically, the present invention can be used to automatically incorporate network equipment (e.g. OLT, ONUs) that supports FEC coding as well as network equipment that does not support FEC coding simultaneously in the same EPON. The EPON automatically initializes each ONU and registers each ONU according to FEC coding capability of the ONU and the communications quality to and from the ONU. FEC coding is implemented when appropriate to improve the quality of the communications.

The principles and operation of a method of performing forward error correction initialization and auto-negotiation in passive optical networks, according to the present invention may be better understood with reference to the drawings and the accompanying description.

Figure 1:
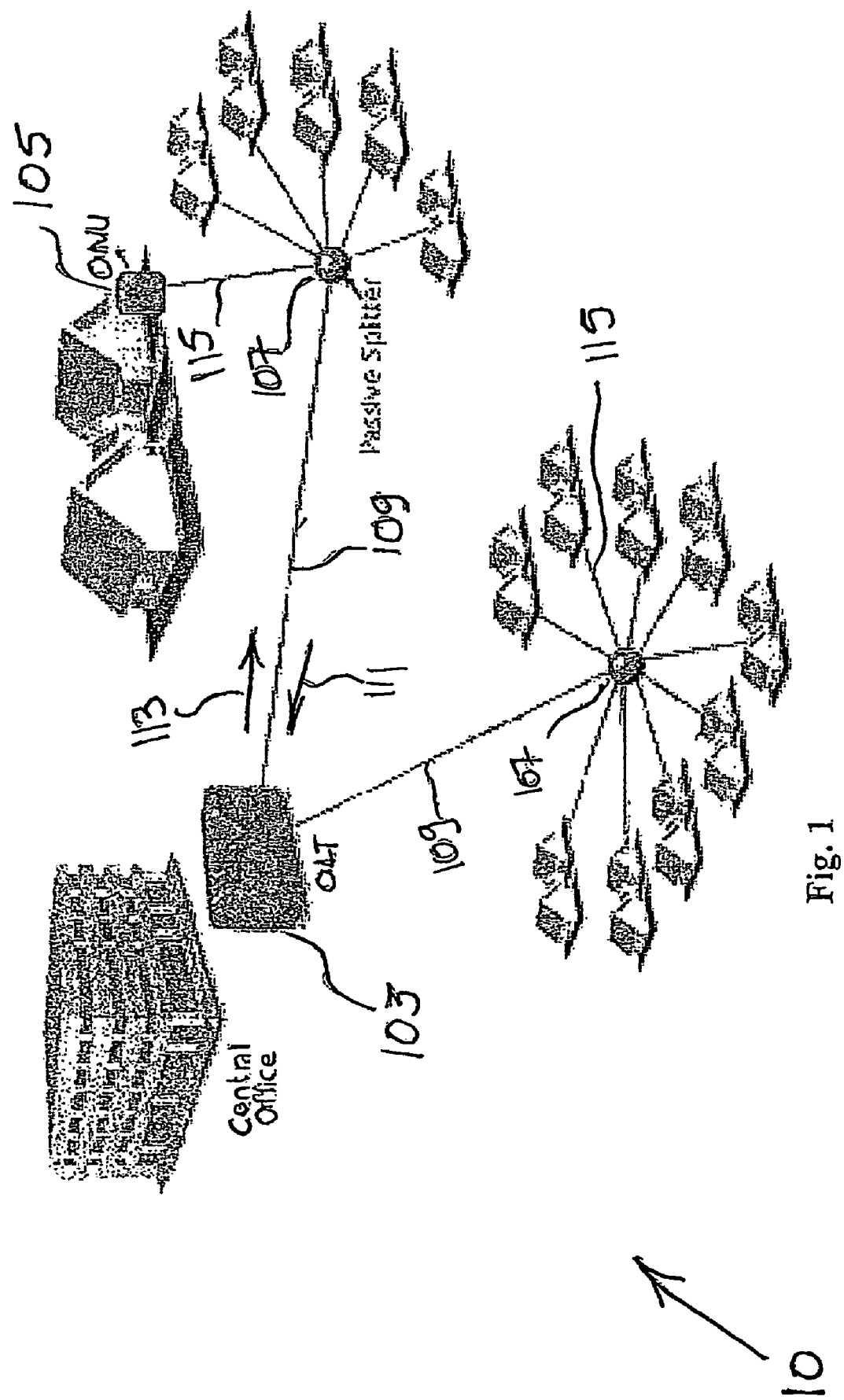
FIG. 1 is a schematic drawing of a passive optical network in use according to the present invention.

Referring now to the drawings, FIG. 1 illustrates an ethernet passive optical network (EPON) 10 functional in accordance with the present invention. EPON 10 includes an optical line terminal (OLT) 103 situated at a central office. OLT 103 broadcasts ethernet communications frames along optical fiber cables 109, as a "downlink" communications signal; the downlink direction is shown by arrow 113. The downlink signal is passively split by passive optical splitters 107. The downlink signal, now substantially attenuated by the optically splitting, is carried to optical network units (ONUs) 105 by fiber optic access cables 115. "Uplink" signals are transmitted from each ONU 105 along fiber optic access cables 115. The uplink signals are combined by passive splitters 107; the combined uplink signals, suitably attenuated, are further carried by optical fiber cables 109, in the uplink direction shown by arrow 111 to OLT 103.

Figure 2:
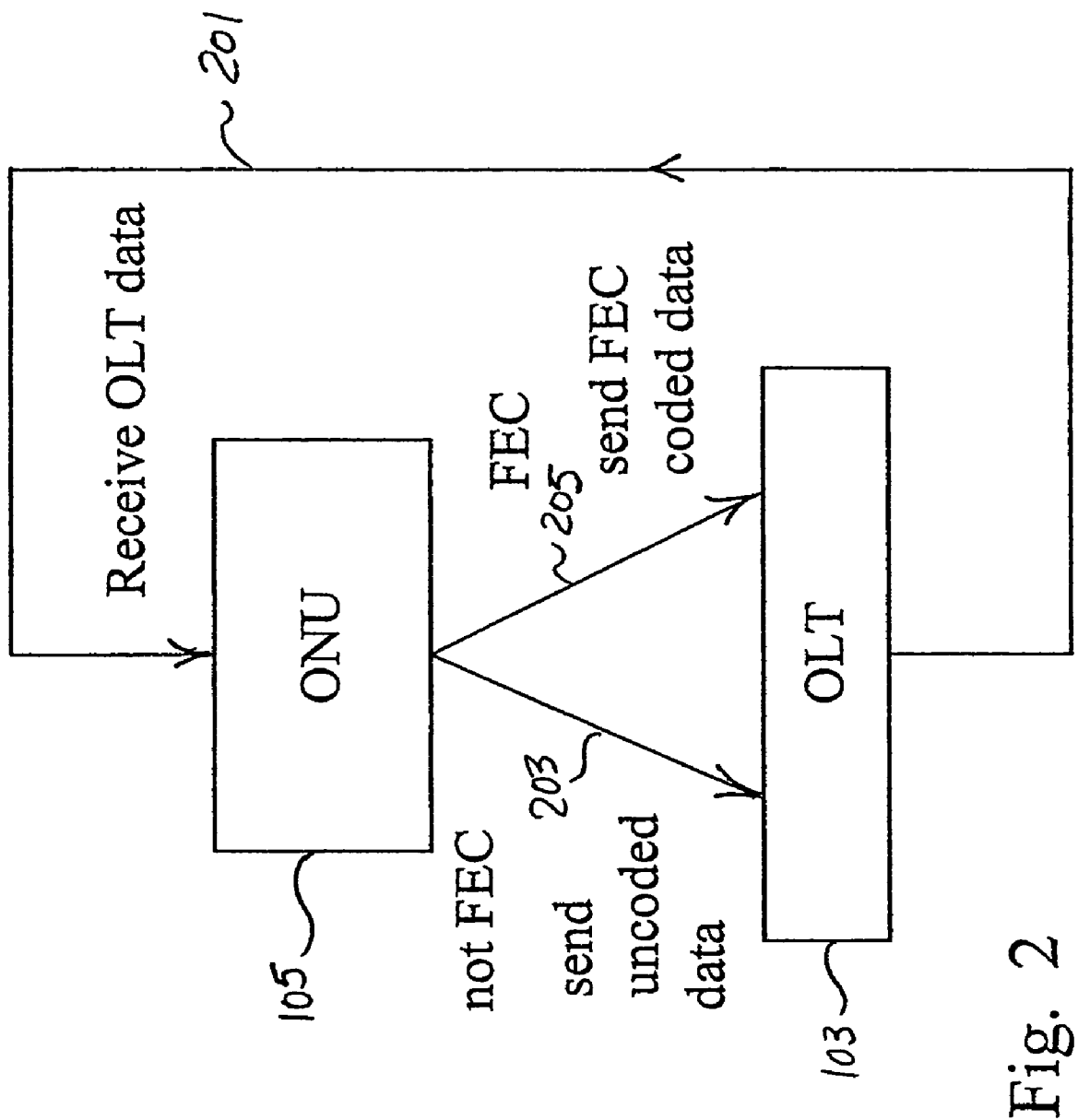
FIG. 2 is a flow chart of an embodiment of the present invention showing an initialization process wherein an optical network unit (ONU) has forward error correction capability.

FIG. 2 is a flow chart of an initialization process, according to an embodiment of the present invention. ONU 105, capable of FEC coding, is added to an EPON 10. ONU 105 receives data from OLT 103 of EPON 10. If the data received from OLT 103 is FEC coded, then ONU 105 sends coded data (step 205) to OLT 103. If the data received from OLT 103 is not FEC coded, then ONU 105 sends uncoded data (step 203) to OLT 103.

Figure 3:
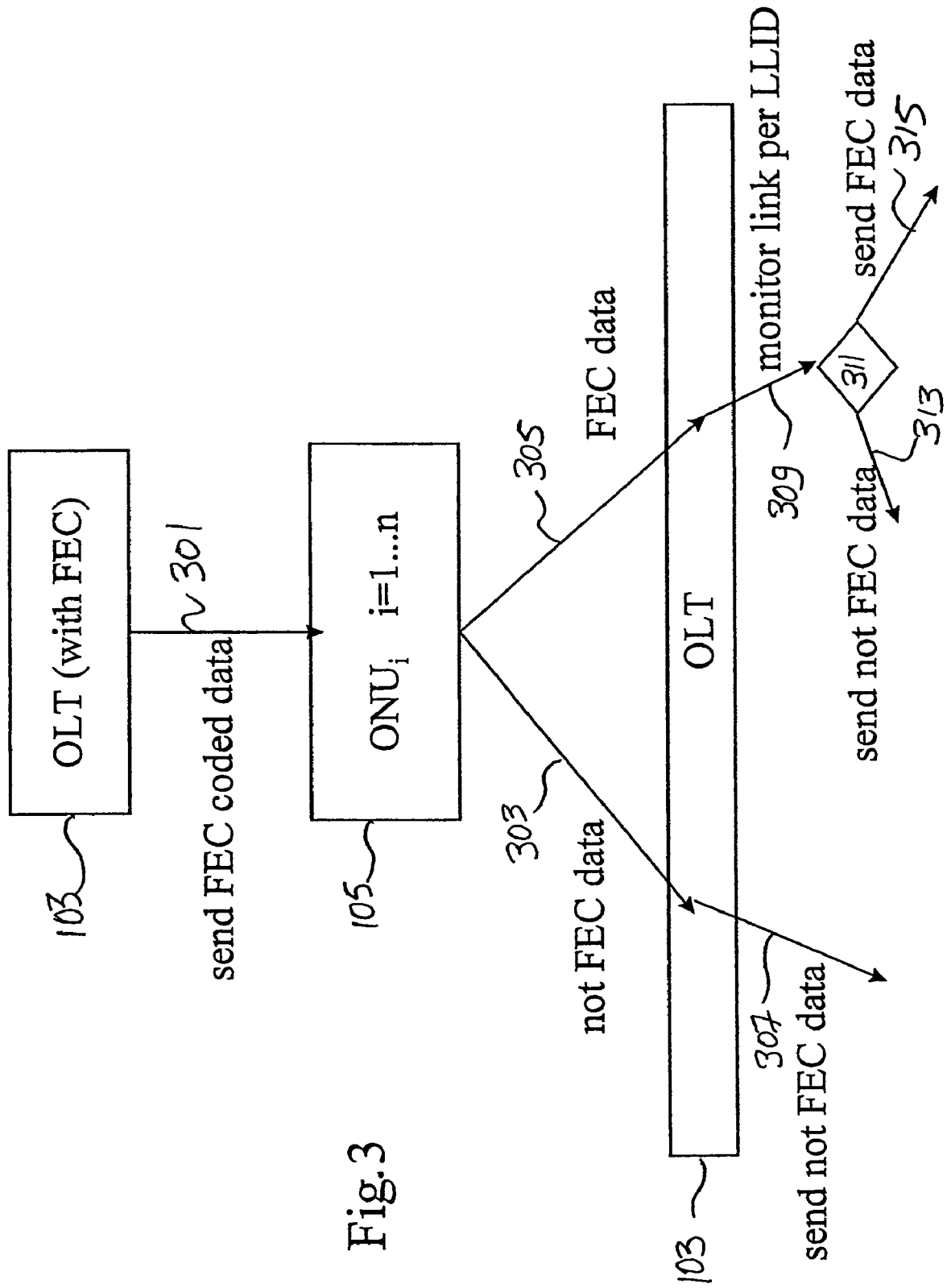
FIG. 3 is a flow chart of an embodiment of the present invention showing forward error correction initialization.

FIG. 3 is a flow chart of an initialization and an auto-negotiation process, according to an embodiment of the present invention. OLT 103 with FEC coding capability sends FEC coded data to all ONUs 105 of EPON 10. Each ONU 105 respectively responds, with either FEC coded data (step 305) or non-FEC coded data (step 303), according to its FEC capability and the communications quality, analogous to the process shown in FIG. 2. OLT 103 upon receiving non-FEC coded data responds henceforth with non-FEC coded data (step 307). If OLT 103 receives FEC coded data (step 305) from ONU 105, then OLT 103 responds henceforth by monitoring the quality of communications (step 309) from ONU 105. OLT 103 identifies ONU 105 by a logical link identification number (LLID) in the ethernet data frame received by OLT 103 as disclosed in reference '370. Monitoring is performed by OLT 103 by determining a figure of merit for communications with ONU 105; based on e.g. bit errors, parity violations, 8B/10B coding violations, and frame errors. The figure of merit is used to determine (decision block 311), if FEC coding is necessary to improve the quality of the communications from ONU 105. If FEC coding is not required then OLT 103 responds henceforth by sending non-FEC coded data (step 313) to ONU 105, thereby improving the throughput of the data link. If FEC coding is required then OLT 103 responds henceforth by sending FEC coded data (step 315) to ONU 105.

Figure 4:
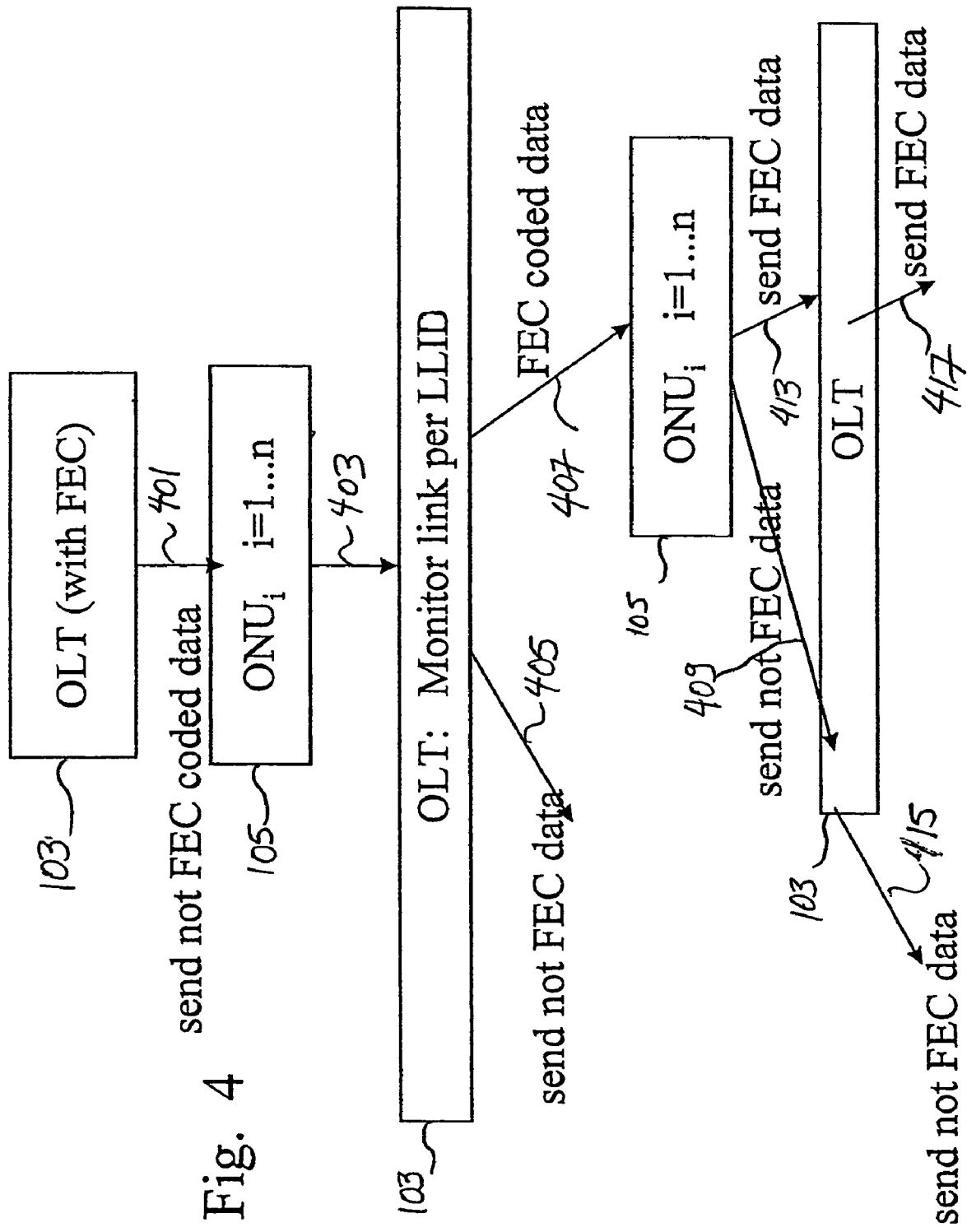
FIG. 4 is a flow chart of another embodiment of the present invention showing forward error correction initialization.

FIG. 4 is a flow chart of an initialization and an auto-negotiation process, according to another embodiment of the present invention. OLT 103 with FEC coding capability sends non-FEC coded data (step 401) to all ONUs 105 of EPON 10. ONUs 105 respectively responds with non-FEC coded data (step 403) to OLT 103. OLT 103, as in the embodiment of FIG. 3, monitors the communications from all ONUs 105 respectively to OLT 103 and determines a figure of merit of communications for each ONU 105. If the figure of merit of ONU 105 is sufficient, then OLT 103 responds to ONU 105 with non-FEC data 405. If the figure of merit for ONU 105 is not sufficient, then OLT 103 responds henceforth to ONU 105 (step 407) with FEC coded data. Upon receiving FEC coded data, ONU 105 with FEC coding capability responds with FEC coded data (step 413). Upon receiving FEC coded data, ONU 105 without FEC coding capability, responds henceforth with non-FEC coded data (step 409). Upon receiving FEC coded data OLT 103 responds henceforth with FEC coded data (step 417). Upon receiving non-FEC coded data, OLT 103, responds with non-FEC coded data. (step 415)

Figure 5:
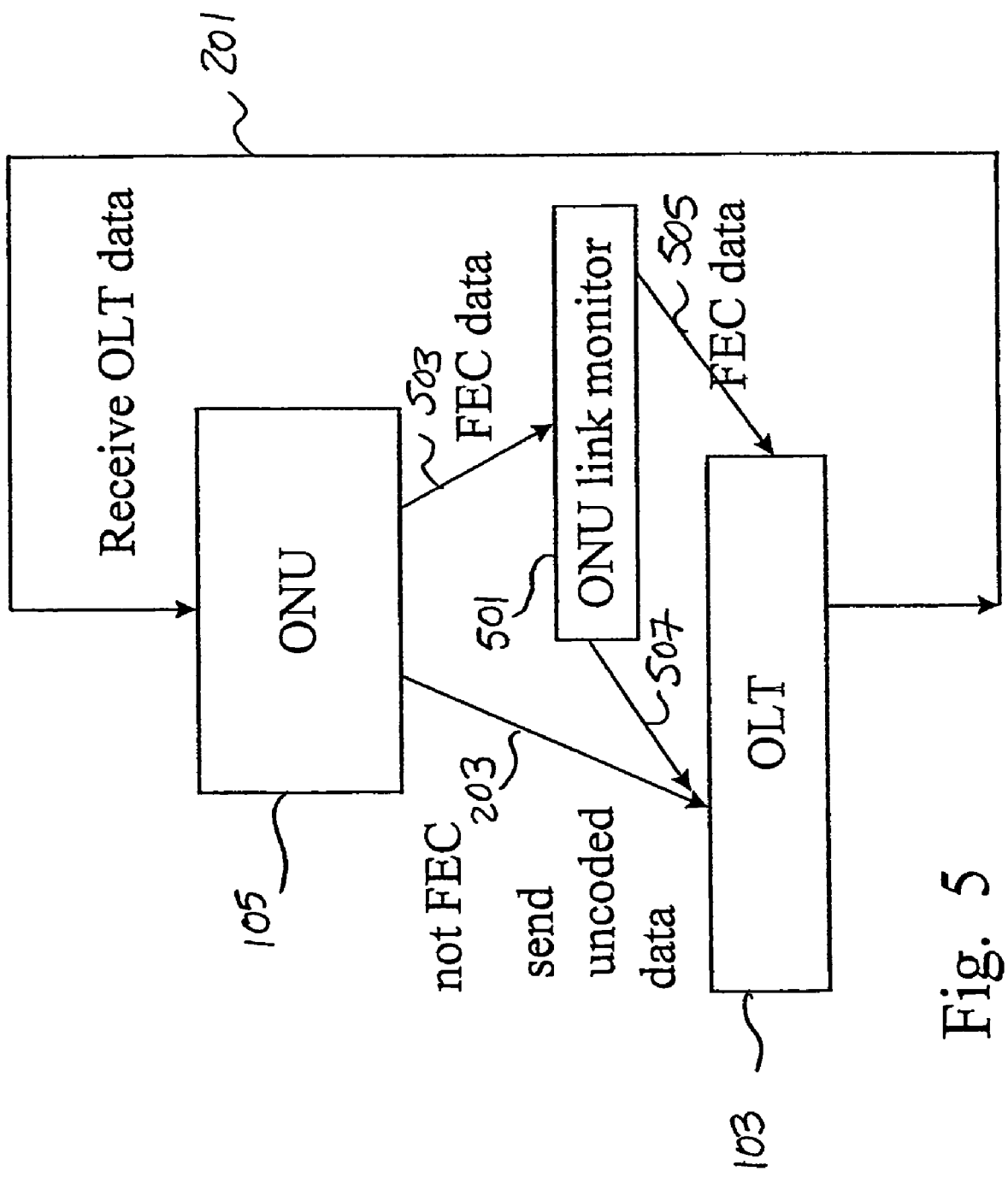
FIG. 5 is a flow chart of yet another embodiment of the present invention showing forward error correction initialization.

FIG. 5 is a flow chart of an initialization and an auto-negotiation process, according to yet another embodiment of the present invention. ONU 105 receives data from OLT 103 (step 201). If the data received is non-FEC coded data, then ONU 105 responds with non-FEC coded data (step 203). However, if the data received by ONU 105 is FEC coded data (step 503), then ONU 105 monitors the received data and determines a figure of merit for the communications from OLT 103. If the figure of merit is sufficient, then ONU 105 responds henceforth with non-FEC coded data (step 507). If the figure of merit is not sufficient, then ONU 105 responds henceforth with FEC coded data (step 505).

While the invention has been described with respect to a limited number of embodiments, it will be appreciated that many variations, modifications and other applications of the invention may be made.

What is claimed is:

1. A method of initiating forward error correction in an ethernet passive optical network including at least one optical network unit, comprising the steps of: by an optical line terminal:
   (a) upon receiving forward error corrected data from the at least one optical network unit, responding thereafter with forward error corrected data; and
   (b) upon receiving data not forward error corrected from the at least one optical network unit, responding thereafter with data not forward error corrected;
   wherein the step of responding thereafter with forward error corrected data includes changing a transmission protocol and state to send forward error corrected protected frames to the at least one optical network unit; and
   wherein the step of responding thereafter with data not forward error corrected includes changing a transmission protocol and state to send data not forward error corrected protected frames to the at least one optical network unit.

2. A method of initiating forward error correction in an ethernet passive optical network including an optical line terminal comprising the steps of: by an optical network unit:

(a) upon receiving forward error corrected data from the optical line terminal, responding thereafter with forward error corrected data; and (b) upon receiving data not forward error corrected from the optical line terminal, responding thereafter with data not forward error corrected;

wherein the step of responding thereafter with forward error corrected data includes changing a transmission protocol and state to send forward error corrected protected frames to the optical line terminal and wherein the step of responding thereafter with data not forward error corrected includes changing a transmission protocol and state to send data not forward error corrected protected frames to the optical line terminal.

* * * * *